A. JAEKEL.
AUTOMATIC COMPRESSOR PUMP.
APPLICATION FILED MAR. 16, 1912.
1,039,539.
Patented Sept. 24, 1912.
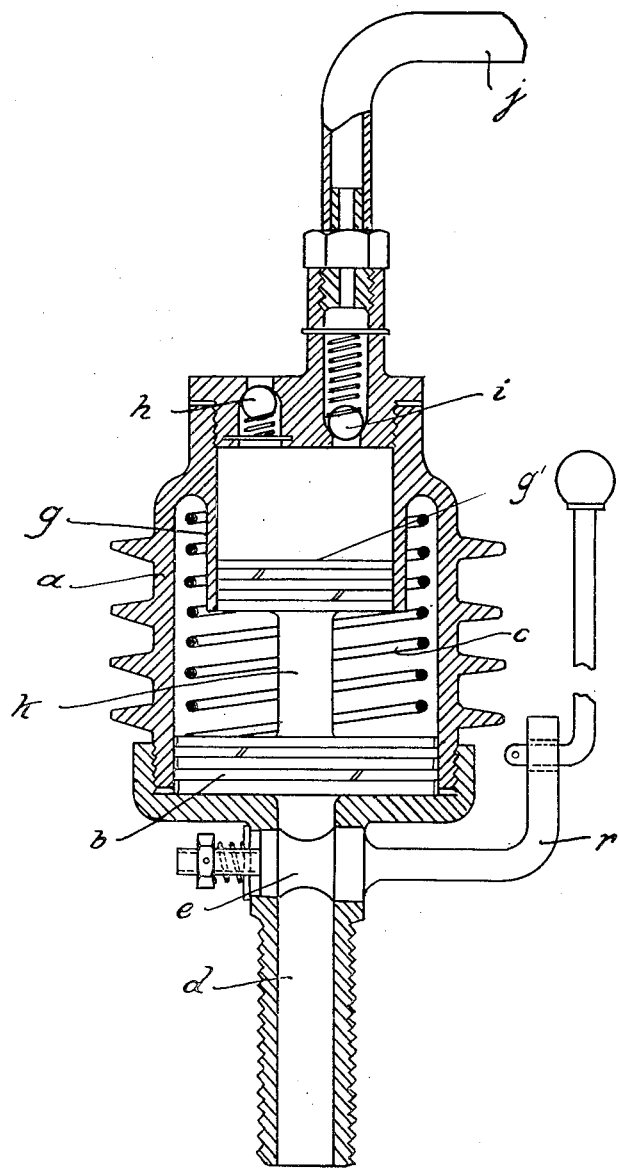

UNITED STATES PATENT OFFICE.

ALFRED JAEKEL, OF PARIS, FRANCE.

AUTOMATIC COMPRESSOR-PUMP.

1,039,539.  Specification of Letters Patent.  Patented Sept. 24, 1912.

Application filed March 16, 1912. Serial No. 684,208.

*To all whom it may concern:*

Be it known that I, ALFRED JAEKEL, civil engineer, a subject of the Emperor of Austria-Hungary, and residing at Paris, in the Republic of France, have invented certain new and useful Improvements in Automatic Compressor-Pumps, of which the following is a specification.

This invention relates to an automatic compressor pump which can be applied by simple connection with the explosion chamber of one of the cylinders directly to all explosion or combustion motors. This connection can be effected by the simple screwing on of a connecting piece provided on the apparatus in the place of the compression cock of one of the cylinders or in the manner of a sparking plug on one of the valve plugs.

Various compressor pumps applicable to automobile motors are already known. Some of these air pumps are actuated by mechanical transmission with or without uncoupling from the motor; others pump directly burned gas mixtures, while others cause one of the motor cylinders to act as an air pump. All these systems are unpractical in consequence of a complicated and costly mounting or of some alteration of the crankshaft necessary on the motor or of the mixing of the compressed air with particles of oil and soot. Especially the latter disadvantage will cause much trouble when the compressor is applied to pump up vehicle tires for the rubber will be destroyed by the oil in short time. The invention now in question avoids all these drawbacks. This compressor supplies perfectly pure air at any desired pressure; it can be applied to all existing motors without alteration thereof, and it can easily be actuated or put out of action from the driver's seat.

The invention is described by way of example in the accompanying drawing.

The apparatus consists of an aspirating and compressing air pump, the cylinder $a$ of which contains a piston $b$, which is continuously pressed downward by means of a spiral spring $c$. The pump cylinder $a$ is connected with one of the cylinders or rather with the explosion chamber thereof by means of a screw connection $d$, which is screwed into it, for instance, at one of the valve plugs. In order not to get oil and soot from the combustion cylinder into the compressed air in the main cylinder $a$, another one the proper air compressing cylinder $g$, the piston $g'$ of which is connected by a rod $k$ to the other piston, is so arranged that the air does not come into contact with the combustion gases. The cylinder $g$ within which operates the air compression piston $g'$ is provided by an annular and inwardly disposed flange, and said flange also provides an annular recess within which seats the spiral spring $c$. At the top of the air cylinder $g$ is located a suitable aspiration valve $h$ and a pressure valve $i$ is connected with a pipe $j$ or the like is provided. In the tube $d$ screwed into the combustion cylinder $a$ valve is provided with a cock $e$ and lever $r$ which may be actuated by means of a rod or wire from the seat of the car driver.

The operation of the apparatus is as follows: When the cock $e$ is open (as shown in the drawing) the pump piston $b$ moves downward in consequence of the pressure of the spiral spring $c$ and of the aspiration period of the motor cylinder. A charge of pure air aspirated through the valve $h$ consequently accumulates above the pump piston, for the pressure valve is of course closed. During the compression period of the motor cylinder the piston $b$ and the pump piston connected therewith rise somewhat, until there is equality of pressure on both sides. Then during the explosion the two pistons are suddenly driven quite up and the compressed air flows from the upper cylinder through the pressure valve $i$ into the pipe $j$ through which it is then supplied to the tires to be pumped up.

Having now described my invention what I claim and desire to secure by Letters Patent of the United States is:

A compressor comprising a casing forming a main cylinder and having an integral and inwardly disposed annular flange forming the compressing chamber, and an annular surrounding recess, said chamber located wholly within said casing; a piston operable in said main cylinder; a piston operable in said compressing chamber; a piston rod connecting said pistons; a spiral spring seated within said annular surrounding recess and disposed against the first named piston; inlet and outlet controlling valves for said compressor; and means for connecting the compressor with an engine cylinder, substantially as described.

In testimony whereof I have affixed my signature in presence of two witnesses.

ALFRED JAEKEL.

Witnesses:
JACK H. BAKER,
EDWARD W. DEESEL.